United States Patent [19] [11] 4,129,267
Degras et al. [45] Dec. 12, 1978

[54] ADJUSTING METHOD AND CLIP FOR RETRACTOR LOCK BAR

[75] Inventors: James C. Degras, St. Clair Shores; David N. Lee, Almont, both of Mich.

[73] Assignee: General Motors Corporation, Detroit, Mich.

[21] Appl. No.: 809,193

[22] Filed: Jun. 23, 1977

[51] Int. Cl.² .................. A62B 35/02; B65H 75/48
[52] U.S. Cl. ............................................. 242/107.4 A
[58] Field of Search ............... 242/107.4 R–107.4 E; 280/744–747; 297/388

[56] References Cited

U.S. PATENT DOCUMENTS

| | | | |
|---|---|---|---|
| 3,873,041 | 3/1975 | Rumpf et al. | 242/107.4 R |
| 3,930,622 | 1/1976 | Tanaka et al. | 242/107.4 A |
| 3,948,460 | 4/1976 | Kondziola | 242/107.4 A |
| 3,990,651 | 11/1976 | Romanzi et al. | 242/107.4 A |

Primary Examiner—Harvey C. Hornsby
Assistant Examiner—John M. Jillions
Attorney, Agent, or Firm—Charles E. Leahy

[57] ABSTRACT

A seat belt retractor has an adjusting clip attached on the lock bar. The adjusting clip is generally U-shaped with spaced apart legs defining a slot by which the clip is engaged over the lock bar. One leg of the adjusting clip is disposed on the side of the lock bar adjacent the reel and has an integral depressed portion which is engaged within a mating aperture of the lock bar to retain the adjusting clip on the lock bar. The other leg of the adjusting clip is disposed on the side of the lock bar adjacent the pendulum and has an integral protuberance extending therefrom into engagement with the control head of the pendulum. The dimensional projection of the protuberance controls the gap between the ratchet teeth of a belt reel and the unlocked position of the lock bar. A plurality of adjusting clips are provided having the protuberances thereof projecting at various dimensions. After assembly of a selected adjusting clip on the lock bar, the at-rest position of the lock bar is gauged to determine if the gap is within a specified tolerance. The gap may be adjusted if necessary by replacing the adjusting clip with another having a protuberance of greater or lesser projection.

5 Claims, 4 Drawing Figures

ADJUSTING METHOD AND CLIP FOR RETRACTOR LOCK BAR

The invention relates to an inertia responsive seat belt retractor and more particularly to providing an adjusting clip on the lock bar by which the unlocking position of the lock bar relative the reel may be selected to control the distance through which an inertia sensing pendulum must move the lock bar.

Conventional vehicle occupant restraint belt retractors have an inertia responsive pendulum for moving a lock bar between an unlocking position which permits belt unwinding and a locking position in which the reel is blocked against rotation in the belt unwinding direction. The lock bar conventionally includes a protuberance which rests on a control head of the pendulum to establish an at-rest position of the lock bar in which there is a gap between the lock bar and ratchet teeth on the reel. An inertia stimulus tilts the pendulum to move the lock bar to the locking position.

It is desirable to accurately control the dimensional gap between the lock bar and the ratchet teeth of the reel in order to assure the desired response of the retractor to an inertia stimulus.

It is known that conventional retractor manufacturing techniques result in a tolerance buildup which can affect the gap between the reel ratchet teeth and the lock bar. For example, many conventional lock bars have a protuberance which rests upon the control head of the pendulum. Accordingly, one variant in establishing the at-rest position of the lock bar is the height of the protuberance.

One prior art seat belt retractor employs a protuberance attached to the lock bar by a screw and comprised of a pair of plastic elements having engaged angularly disposed surfaces whereby relative rotation therebetween effects a corresponding change in the effective height of the protuberance. Thus, the lock bar may be adjusted to provide a selected gap between the lock bar and the ratchet teeth.

According to the present invention, an adjusting clip is provided for attachment on a lock bar having a generally planar surface. The adjusting clip is generally U-shaped with spaced apart legs defining a slot by which the clip is engaged over the lock bar. One leg of the adjusting clip is disposed on the side of the lock bar adjacent the reel and has an integral depressed portion which is engaged within a mating aperture of the lock bar to retain the adjusting clip on the lock bar. The other leg of the adjusting clip is disposed on the side of the lock bar adjacent the pendulum and has an integral protuberance extending therefrom and adapted to engage the control head of the inertia pendulum. The dimensional projection of the protuberance from the planar surface of the lock bar controls the gap between the reel ratchet teeth and the unlocked position of the lock bar. A plurality of adjusting clips are provided having the protuberances thereof projecting at various dimensions. After assembly of a selected adjusting clip on the lock bar, the distance between the reel shaft and the at-rest position of the lock bar is gauged to determine if the gap is within a specified tolerance. The gap may be adjusted if necessary by replacing the first selected adjusting clip with another having a protuberance of greater or lesser projection.

One feature, object, and advantage of the invention is the provision of an adjusting clip attachable to a lock bar and having a protuberance engageable with the inertia responsive member to poise the lock bar at a selected gap from the ratchet teeth on the reel.

Another feature, object and advantage of the invention is a method of locating a lock bar relative a reel by the selection and attachment to the lock bar of an adjusting clip having a protuberance extending into engagement with the inertia sensing member.

Another feature, object and advantage of the invention is the provision of an adjusting clip having spaced apart legs for engagement over the lock bar with a retaining feature on one leg and a pendulum engaging protuberance on the other leg to establish the at-rest location of the lock bar relative the reel.

These and other objects, features and advantages of the invention will become apparent upon consideration of the specification and the appended drawings in which.

Figure 1:
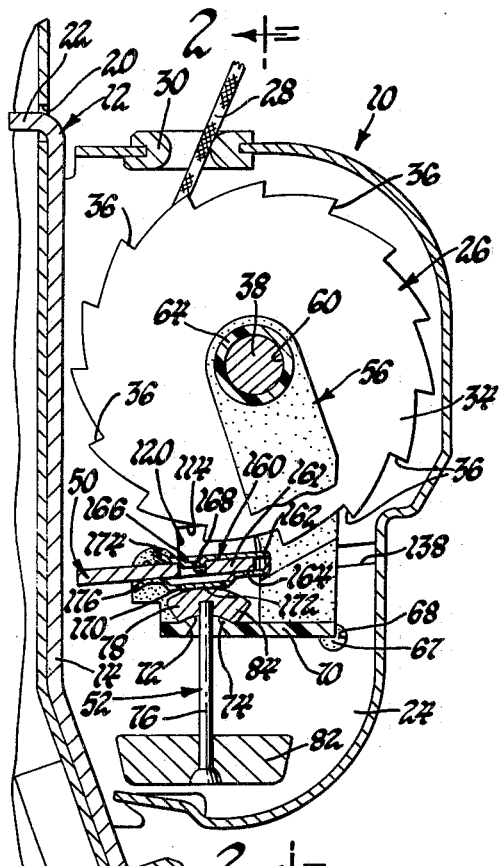
FIG. 1 is a sectional view through a vehicle body having a seat belt retractor embodying the adjusting clip according to the invention and having parts broken away and in section.
Figure 2:
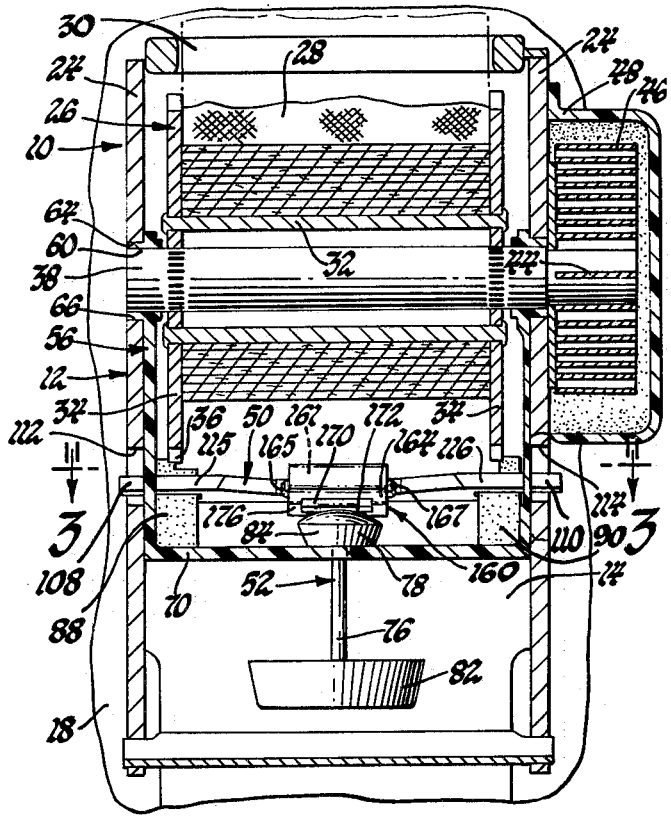
FIG. 2 is a sectional view taken in the direction of arrows 2—2 of FIG. 1.

Referring to FIGS. 1 and 2 of the drawings, a vehicle occupant restraint belt retractor is generally indicated by 10 and includes a metal retractor housing generally designated by 12. The housing 12 includes a base wall 14 having a weld nut 16 which receives a threaded bolt 17 to secure the lower end of the retractor to a vehicle body support member 18. The upper end of the support member 18 defines an aperture 20 that receives a positioning flange 22 of the retractor housing 12 to complete the securement and positioning of the retractor 10. The retractor housing 12 also includes a pair of spaced parallel sidewalls 24 that are formed integral with the base wall 14. A belt reel designated generally by 26 is rotatably mounted between the sidewalls 24 of the retractor housing 12 and receives a belt 28 that extends upwardly through a belt guide 30 on the upper side of the retractor. The belt 28 thus extends outwardly for positioning across the vehicle occupant to provide a restraining function in the conventional manner.

The belt reel 26 of retractor 10 includes an elongated belt drum 32 on which the belt 28 is wound and which extends between ratchet plates 34 on the opposite sides of the belt 28. The ratchet plates 34 are suitably fixed to the opposite sides of the belt drum 32 and have ratchet teeth 36 which face in the belt unwinding direction of reel rotation. An elongated reel shaft 38 is received by the belt drum 32 and suitably fixed to the ratchet plates 34 such as by splining. The ends of the reel shaft 38 are rotatably supported on the housing sidewalls 24 in a manner which will be fully described hereinafter. The FIG. 2 right-hand end of the reel shaft 38 extends outwardly through the adjacent housing sidewall 24 and has a slot which receives the inner end 44 of a spiral or clock spring 46. The outer end of the spring, not shown, is suitably fixed to the adjacent housing sidewall 24 so that the belt reel 26 is normally biased in a belt winding direction to store the belt 28 on the belt reel 26. A cover 48 is attached to the sidewalls 24 and conceals the spring 46.

A lock bar 50 is mounted for pivotal movement into locking engagement with the ratchet teeth 36 of the ratchet plates 34. The lock bar 50 is moved between the nonlocking position of FIG. 1 and a locking position by an inertia actuated pendulum indicated generally at 52.

According to this invention, a pendulum support indicated generally at 56 is preferably of injection molded resilient plastic and includes laterally spaced sidewalls 58 which are juxtaposed to the sidewalls 24 of the retractor housing 12. The upper ends of the sidewalls 58 extend between the sidewalls 24 and the adjacent ratchet plates 34 and have apertures 60 which receive the ends of the reel shaft 38. Bushing portions 64 are integral with the sidewalls 58 and extend laterally outwardly into apertures 66 of the sidewalls 24. The bushing portions 64 thus journal the reel shaft 38 for rotation relative the retractor housing 12. A projection 67 extends laterally from each of the sidewalls 58 and is engaged in mating apertures 68 of the housing sidewalls 24 to fix the pendulum support 56 against rotation about the reel shaft 38.

The pendulum support 56 also includes a pendulum support portion 70 which is integral with the sidewalls 58 and bridges the lateral space between the sidewalls 58. The pendulum support portion 70 has a central aperture 72 and an upstanding lip 74 which surrounds the aperture 72.

The pendulum, generally indicated at 52, has a stem 76 which extends through the aperture 72 and mushrooms outwardly above the pendulum support portion 70 to provide a control head 78. A weight 82 is staked to the lower end of the stem 76. The control head 78 has a downwardly extending peripheral lip 84 which cooperates with the lip 74 of the pendulum support portion 70 to support and locate the pendulum 52 centrally in the aperture 72. The upper side of the pendulum control head 78 is engaged by the lock bar 50 in a manner to be described hereinafter.

Figure 4:
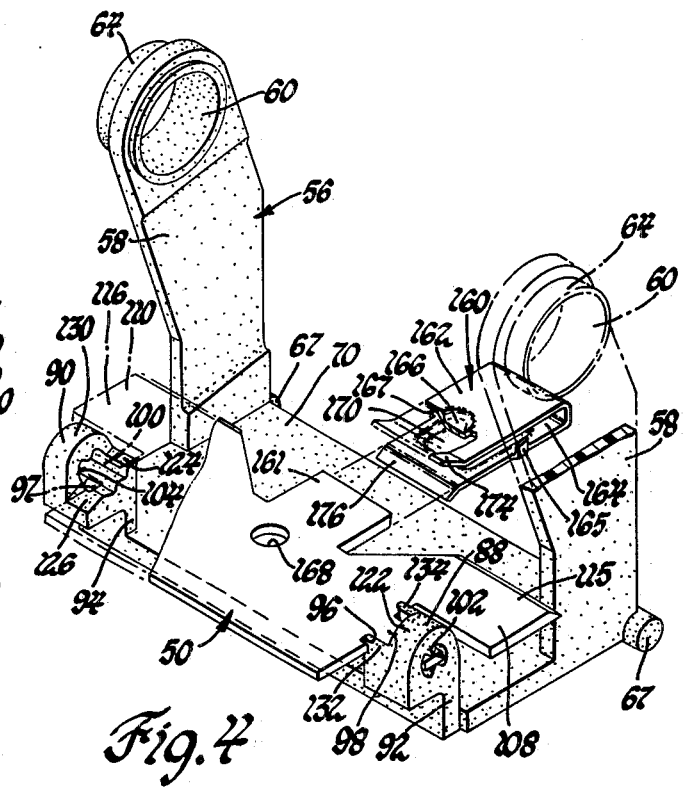
FIG. 4 is a perspective view of the pendulum support, lock bar and adjusting clip.

The pendulum support 56 also has a pair of laterally spaced pivot mounts 88 and 90 which are respectively integrally molded with the pendulum support portion 70 and connected therewith by integral upstanding flexure elements 92 and 94. As best seen in FIGS. 2 and 4, the lock bar 50 is a generally planar sheet metal stamping having end walls 96 and 97 and laterally projecting pivot ears 98 and 100 which are respectively pivotally received in bow-tie shaped apertures 102 and 104 provided in the pivot mounts 88 and 90. The lock bar 50 also has laterally extending abutment ears 108 and 110 which respectively extend through apertures 112 and 114 provided in the sidewalls 24 of the retractor housing 12. The apertures 112 and 114 are of sufficient size to permit pivotal motion of the lock bar 50 between its normal unlocking position shown in the drawing and a locking position in which locking tangs 115 and 116 are engaged with the ratchet teeth 36. The apertures 112 and 114 are respectively defined in part by abutment walls 118 and 120 of the housing sidewalls 24 which are normally spaced from the abutment ears 108 and 110 of the lock bar 50 but are engageable by the abutment ears 108 and 110 upon yielding of the flexure elements 92 and 94 to anchor the lock bar 50 against movement by the force applied thereto by the ratchet teeth 36 of the belt reel 26.

The support member 56 and the retractor housing 12 have features which facilitate the assembly of the retractor. As best seen in FIG. 4, the pivot mount 90 has a laterally outer portion 130 which encircles the lock bar pivot ear 100 and a laterally inner abutment portion 124 having an angularly disposed surface 126. The pivot mount 88 has a laterally outer portion 122 which encircles the lock bar pivot ear 98 and a laterally inner abutment portion 132 which defines an upwardly opening entry slot 134.

The lock bar 50 is mounted in the pivot mounts 88 and 90 by first inserting the ear 100 into the aperture 104 while the lock bar 50 is pivoted to an angular position parallel with the angularly disposed surface 126 so that the lock bar can be moved leftwardly of the centered position shown in FIG. 4 sufficiently to permit the lock bar pivot ear 98 to be lowered into the entry slot 134 of the pivot mount 88. As seen in FIG. 4, the lateral extent of the lock bar 50 as defined by the end walls 96 and 97 is sufficiently less than the lateral spacing between the laterally outer portions 122 and 130 to permit this lateral shifting of the lock bar 50 from the centered position of FIG. 4. After the ear 98 is lowered through the entry slot 134, the lock bar 50 is shifted rightwardly as viewed in FIG. 4 to center the lock bar 50 between the pivot mounts 88 and 90.

Figure 3:
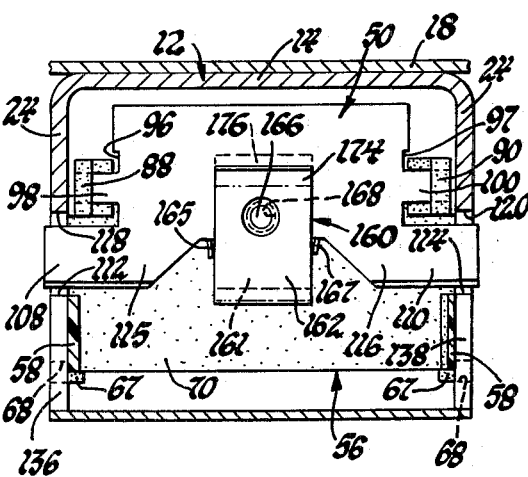
FIG. 3 is a sectional view taken in the direction of arrows 3—3 of FIG. 2.

When the lock bar 50 is centered as shown in FIGS. 3 and 4 and the pendulum 52 is in its normal vertical position, the lock bar 50 assumes an angular position of FIGS. 1 and 2 wherein the laterally inner abutment portion 124 of the pivot mount 90 is engageable by the lock bar 50 to prevent the lock bar 50 from being returned leftwardly as viewed in FIG. 4 to the position wherein pivot ear 98 could be lifted through the entry slot 134.

The aforedescribed procedure of mounting the lock bar 50 in the pendulum support 56 is performed prior to assembly of the pendulum support 56 into the retractor housing 12. Subsequent to assembly of the pendulum support 56 and the lock bar 50 therewith into the retractor housing 12, engagement of the lock bar 50 with the ratchet plates 34 limits the range of pivoting motion of the lock bar 50. The angle of the angularly disposed surface 126 of abutment portion 124 is selected to have a greater angle from the horizontal than the angle reached by the lock bar 50 during its engagement with the ratchet plates 34. Thus, the ratchet plates 34 block pivoting of the lock bar 50 to an angular position wherein the lock bar end wall 97 is freed from engagement with the abutment portion 124. Accordingly, subsequent to assembly of the pendulum support 56 and lock bar 50 into the housing 12, the lock bar 50 is prevented from being shifted leftwardly away from its centered position of FIG. 4 such as would permit the pivot ear 98 to be lifted through the entry slot 134 of the pivot support 88.

As best seen in FIGS. 1 and 3, the sidewalls 24 of the retractor housing 12 have respective slots 136 and 138 which extend from an outer edge of the sidewall 24 into communication with the apertures 112 and 114. Accordingly, the pendulum support 56 and the lock bar 50 may be installed in the retractor housing 12 by guiding the abutment ears 108 and 110 through the slots 136 and 138. The sidewalls 58 of the pendulum support 56 are bent toward one another so that the bushing portions 64 fit between the sidewalls until they are aligned for insertion into the sidewall apertures 66. The pendulum support portion 70 is bowed sufficiently to permit passage of the projections 67 between the sidewalls 24 and their insertion into the sidewall apertures 68. Once the pendulum support 56 is installed in the retractor housing 12, the outer ends of the lock bar pivot ears 98 and 100 are engageable with the housing sidewalls 24 to limit lateral shifting movement of the lock bar 50 and retain the lock bar in the centered position of FIG. 4.

Referring to the drawings, it is seen that an adjusting clip 160 is attached to a central portion 161 of the lock bar 50. The adjusting clip 160 is generally U-shaped with spaced apart legs 162 and 164. The upper leg 162 overlies the top surface of the lock bar 50 and has a depressed portion 166 which extends into a mating aperture 168 provided in the central portion 161 of the lock bar 50 to locate and retain the adjusting clip 160 on the lock bar. The lower leg 164 of the adjusting clip 160 includes a protuberance 170 having a generally planar surface 172 which rides on the control head 78 of the pendulum 52. Lower leg 164 also has tangs 165 and 167 which extend upwardly to resiliently engage the side edges of the lock bar central portion 161 to provide additional retention and block rotation of the clip. The ends of the upper and lower legs of the adjusting clip 160 are flared outwardly from one another at 174 and 176 to facilitate entry of the body of the lock bar central portion 161 between the legs 162 and 164. The resiliency of the adjusting clip 160 biases the depressed portion 166 of upper leg 162 within the mating aperture 168 of the lock bar 50 to retain the adjusting clip on the lock bar 50.

In operation, the pendulum 52 swings from its vertically depending orientation of FIGS. 1 and 2 to an inclined position in response to a predetermined change in vehicle acceleration or deceleration. This swinging movement of the pendulum 52 causes the pendulum control head 78 to pivot and thereby move the adjusting clip 160 of lock bar 50 upwardly so that the locking tangs 115 and 116 engage the ratchet teeth 36. Rotation of the belt reel 26 in the unwinding direction imparts a torque to the ratchet plates 34 which is transferred to the lock bar 50. The integral flexure elements 92 and 94 of the pendulum support 56 flex sufficiently to allow the pivot mounts 88 and 90 and lock bar 50 to move bodily and thereby carry its abutment ears 108 and 110 into engagement with the abutment walls 118 and 120 of the sidewall apertures 112 and 114. The engagement of the abutment ears 108 and 110 with the abutment walls 118 and 120 limits motion of the lock bar 50 and thereby blocks further unwinding rotation of the ratchet plates 34 and the belt reel 26.

When the vehicle acceleration of deceleration is terminated, gravity returns the pendulum 52 to its normal vertical position and likewise allows pivoting of the lock bar 50 in the pivot mounts 88 and 90 downwardly and out of engagement with the ratchet teeth 36 so that belt unwinding is again permitted. The flexure elements 92 and 94 resiliently return the pivot mounts 88 and 90 to the normal position of FIG. 4 wherein the lock bar abutment ears 108 and 110 are spaced from abutment walls 118 and 120.

As best seen in FIG. 1, the gap between the locking tangs 115 and 116 of the lock bar 50 and the ratchet teeth 36 of ratchet plates 34 depends in part upon the extent by which the protuberance 170 extends from the lower leg 164 of the adjusting clip 160. Accordingly, a plurality of the adjusting clips 160 are provided with protuberances 170 having varying extents of projection so that the selection of an appropriate clip will provide a specified gap.

During assembly of the retractor, the desired gap between the lock bar and ratchet teeth 36 is provided by first gauging the gap which is attained with a particular clip and then substituting a clip having a greater or lesser projecting protuberance as necessary to obtain the specified gap.

In actual use, it has been determined that the gauging is most conveniently performed by using the aperture 60 of the pendulum support 56 as a reference point and then measuring to the tips of the lock bar locking tangs 115 and 116. If the specified measurement is not obtained, an adjusting clip having a protuberance of greater or lesser projecting extent is substituted to bring the at-rest position of the lock bar within its permissible tolerance range. Gauging in this fashion is found to be simpler than gauging between the lock bar and the ratchet teeth 36 and is made possible by reducing the tolerance to accommodate whatever slight variation there might be in the dimensions of the ratchet plates 34 and the teeth 36 thereon.

It will be understood that the lock bar adjusting clip 160 of this invention could be used in retractors having a ball-type inertia sensor or the equivalent as taught by the prior art instead of the pendulum 52 as shown in the drawings.

Thus, it is seen that the invention provides an improved retractor having an adjusting clip attached to the lock bar to locate the lock bar at an at-rest position providing a desired gap relative the reel.

The embodiments of the invention in which an exclusive property or privilege is claimed are defined as follows:

1. In a vehicle inertia responsive seat belt retractor having a housing, a belt reel rotatably mounted on the housing for winding and unwinding a seat belt, a lock bar for locking the reel against belt unwinding rotation and being pivotally mounted for movement between a locking position and an unlocking position, and an inertia responsive member mounted for movement in response to a predetermined level of inertia stimulus to operate the lock bar from the unlocking position to the locking position, the improvement comprising: an adjusting clip providing the operating connection between the inertia responsive member and the lock bar, said clip means being generally U-shaped with spaced apart legs defining a slot which receives the lock bar to retain the clip means on the lock bar, one of the legs of the clip means being disposed adjacent the inertia responsive member and having an integral nonyieldable protuberance extending therefrom and adapted to operatively engage the inertia sensing means, said integral protuberance of the clip means projecting from the leg a selected distance to poise the lock bar at an unlocking position at a selected distance from the reel to control the distance through which the lock bar must be moved from the unlocking position to the locking position.

2. In a vehicle inertia responsive seat belt retractor having a housing, a belt reel rotatably mounted on the housing for winding and unwinding a seat belt, a lock bar for locking the reel against belt unwinding rotation and being pivotally mounted for movement between a locking position and an unlocking position, and an inertia responsive member mounted for movement in response to a predetermined level of inertia stimulus to operate the lock bar from the unlocking position to the locking position, the improvement comprising: clip means providing the operating connection between the inertia reponsive member and the lock bar, said clip means being generally U-shaped with spaced apart legs defining a slot which receives the lock bar, one of the legs of the clip means having a depressed portion for mating engagement with the lock bar to retain the clip on the lock bar, the other leg of the clip being disposed adjacent the inertia responsive member and having an integral nonyieldable protuberance extending therefrom and adapted to operatively engage the inertia sensing means, said protuberance of the clip means projecting from the other leg a selected distance to poise the lock bar at an unlocking position at a selected distance from the reel to control the distance through which the inertia sensing member must move the lock bar from the unlocking position to the locking position.

3. In a vehicle inertia responsive seat belt retractor having a rotatable belt reel, a movable lock bar having a normal position spaced from the reel and being movable into locking engagement with the reel to lock the reel against rotation in a belt unwinding direction, and an inertia responsive member operatively engaging the lock bar to support the lock bar in its normal unlocking position and being operable under inertia forces to move the lock bar into engagement with the reel, a method of locating the lock bar at a predetermined distance from the reel comprising: gauging the distance between the reel and the inertia responsive member, and attaching an adjusting clip to the lock bar, said adjusting clip having a nonyieldable protuberance projecting therefrom and engaging the inertia responsive member to poise the lock bar at a precise distance from the reel to control the distance through which the lock bar must be moved from the unlocking position to the locking position.

4. A method of providing a precise spacing between a ratchet wheel and an at-rest lock bar movable by an inertia sensing member into locking engagement of the ratchet wheel to lock a seat belt reel against belt unwinding rotation comprising:

gauging the distance between the ratchet wheel and the inertia sensing member;

selecting a particular adjusting clip having a nonyieldable protuberance projecting therefrom for engagement with the inertia sensing member to provide the desired precise spacing between the ratchet wheel and the at-rest position of the lock bar from an available plurality of adjusting clips having nonyieldable protuberances of various size;

and attaching the selected adjusting clip to the lock bar to establish a precise spacing between the lock bar and the ratchet wheel through which the inertia sensing member must move the lock bar to engage the ratchet wheel.

5. In a vehicle inertia responsive seat belt retractor having a rotatable belt reel, a movable lock bar having a normal position spaced from the reel and being movable into locking engagement with the reel to lock the reel against rotation in the belt unwinding direction, and an inertia responsive member operatively engaging the lock bar to support the lock bar in its normal unlocking position and being operable under inertia forces to move the lock bar into locking engagement with the reel, a method of locating the lock bar at a predetermined distance from the reel comprising: attaching an adjusting clip to the lock bar, said adjusting clip having a nonyieldable protuberance projecting therefrom and engaging the inertia responsive member to poise the lock bar at a certain distance from the reel; gauging the at-rest position provided by the first selected adjusting clip; and replacing the first selected adjusting clip with another adjusting clip having a protuberance projecting therefrom to a greater or lesser extent as required to adjust the at-rest position of the lock bar to provide a specified gap between the lock bar and the reel.

* * * * *